July 5, 1966  J. BURNBAUM  3,259,740
ILLUMINATING ORNAMENT HAVING A LENS MEMBER
Filed Nov. 21, 1963  3 Sheets-Sheet 1

INVENTOR.
Jack Burnbaum
BY Harold E. Cole
Attorney

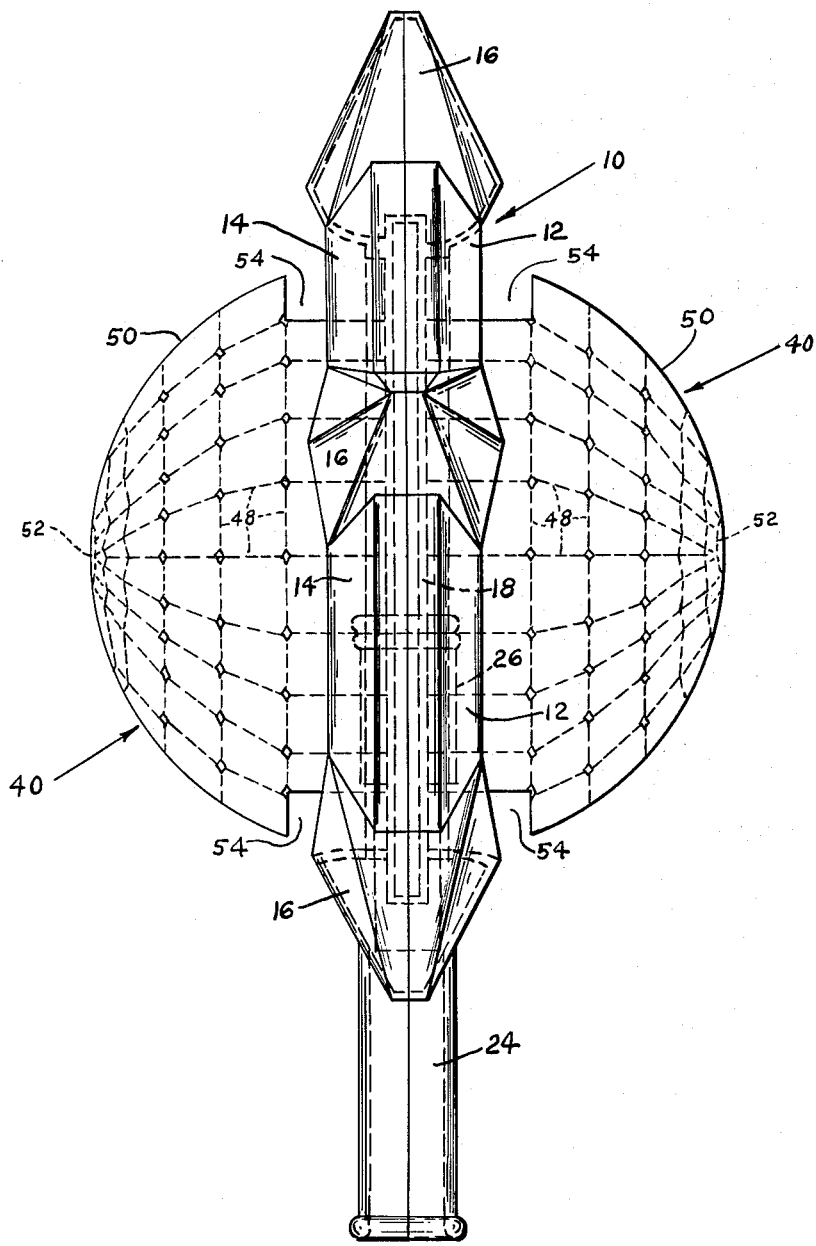

July 5, 1966  J. BURNBAUM  3,259,740
ILLUMINATING ORNAMENT HAVING A LENS MEMBER
Filed Nov. 21, 1963  3 Sheets-Sheet 3
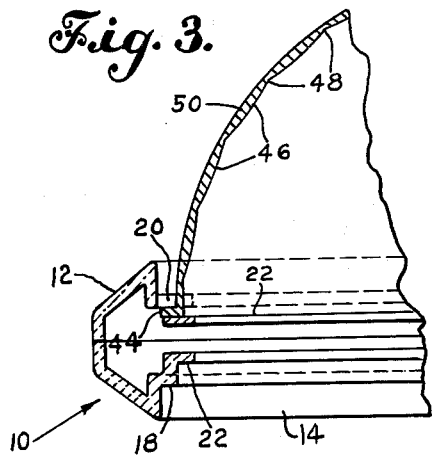
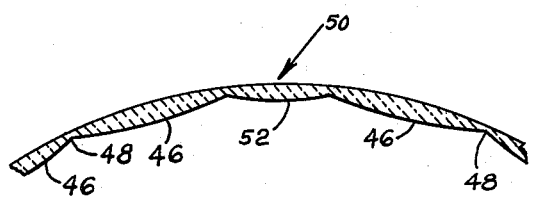
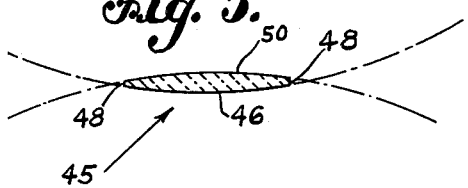
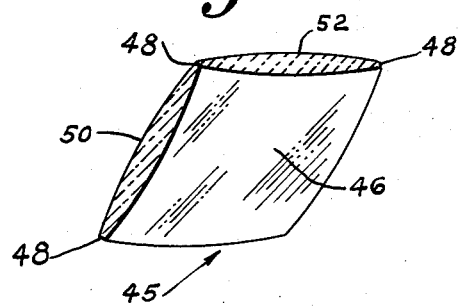
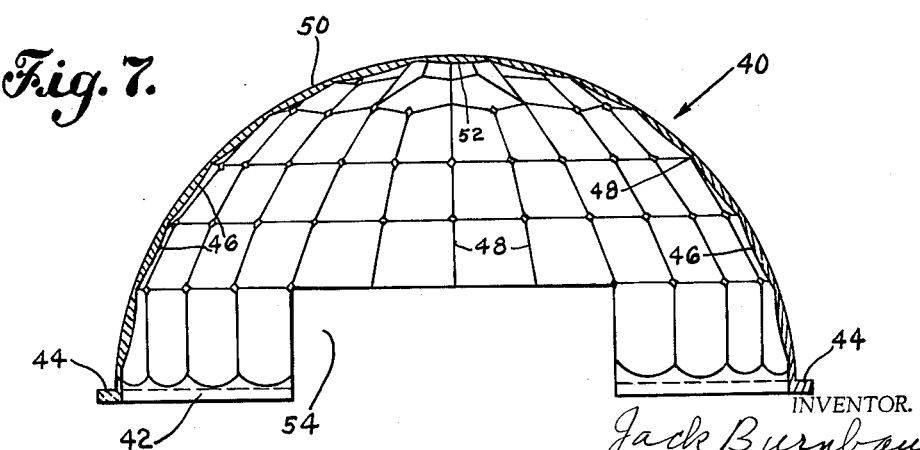
INVENTOR.
Jack Burnbaum
BY Harold E. Cole
Attorney United States Patent Office 3,259,740
Patented July 5, 1966

3,259,740
ILLUMINATING ORNAMENT HAVING A LENS MEMBER
Jack Burnbaum, 451 D St., Newton, Mass.
Filed Nov. 21, 1963, Ser. No. 325,242
4 Claims. (Cl. 240—106)

This invention relates to an illuminating ornament having a lens member to transmit light beams.

One object of my invention is to provide such an ornament that will transmit beams of light that are uniform and are displayed in an orderly and attractive way.

Another object is to provide a lens member having many and continuous, integral lens portions with convex surfaces formed at the inner surface of said lens member.

A further object is to provide such a lens member that can be molded or otherwise formed unitarily with a plurality of integral lens portions.

A still further object is to so form said lens member that the source of light, such as a filament, is at approximately the same distance from the various lens portions.

The foregoing and other objects, which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

FIG. 2 is a side elevational view of said ornament.

FIG. 3 is a sectional view taken on the line 3—3 of FIG. 1.

FIG. 4 is an enlarged, fragmentary, cross-sectional view showing a portion of a lens member.

FIG. 5 is an enlarged, cross-sectional view showing a lens portion that is an integral part of a lens member, the radial lines indicating that the curvatures of the inner and outer surfaces of a lens portion are the same.

FIG. 6 is a perspective view of said lens portion shown in FIG. 5.

FIG. 7 is a cross-sectional view of a lens member.

Figure 1:
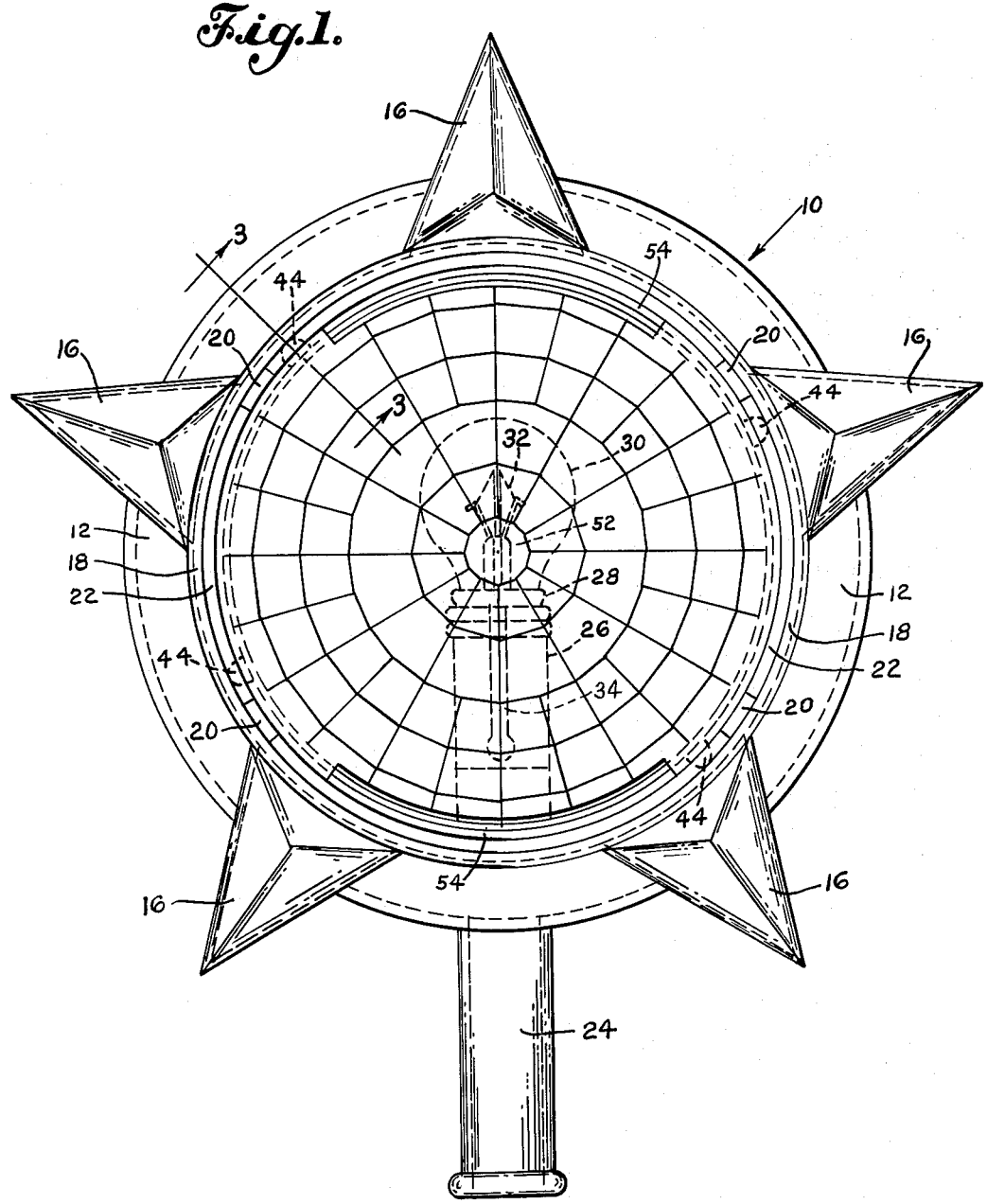
FIG. 1 is a front elevational view of an illuminating ornament with lens members.

As illustrated my ornament has a support 10 which is herein shown as a holder or retainer which is formed in two sections 12 and 14, that are preferably duplicates, and are cemented together. Since said sections are duplicates, I apply the same numerals to the different parts of each. Each has ornamental, pointed portions 16 extending outwardly from the periphery thereof. Also each has an outer raised rim 18 in which cut-outs 20 are provided that receive attaching lugs 44 later described.

Each said section 12 and 14 has an inner rim 22 against which bears a lens member 40, later described. Projecting outside of each of said sections is a stem portion 24 which, when the two are assembled, provide an elongate opening to receive a Christmas tree top or the like. Projecting inwardly beyond said rims 18 and 22 are inner stem portions 26 that leave a space between them to provide a holder or support for illuminating means that includes a socket 28 extending into said holder and that receives a light bulb 30 having the usual filament 32 therein. The latter is preferably located centrally within the interior of the two associated lens members 40.

Each of said stem portions 26 has an elongate slot 34 to permit electric wires to enter the interior of said socket 28.

While I have shown and described in detail one form of support 10 for said lens members 40, it is only an example since various kinds of supports or holders are suitable.

To attain the desired illuminating effects, I provide a lens member 40 which preferably is substantially semi-globular in shape, being open at one end. Approximately one-half portion of a globe may serve as a suitable lens member, for instance. In said FIG. 2 I show two lens members, that are duplicates, and which are suitable for use in the practical application of my invention. Because they are duplicates, they, and the parts thereof, are given the same numerals. These lens members 40 are shown arranged at opposite sides in said FIG. 2, each forming approximately one-half a globe and being mounted on said support, slightly spaced from each other.

At the open end portion each said lens member 40 has an attaching rim portion 42, the inner and outer surfaces of which are smooth and each has connector lugs 44 extending outwardly. The latter enter said cut-outs 20 and are then rotatably slid beyond to thereby retain said lens members 40 mounted on said sections 12 and 14.

The larger part of said lens member 40, at its inner surface, is divided into what serve as distinct lens portions 45 that form, together with said rim portion 42, an integral unit. It may be made of a transparent plastic, such as polystyrene or an acrylic plastic, in a single molding operation.

Each lens portion 45 has an inner convex surface 46 whose area is defined by the four delineating lines 48, towards which the material tapers in thickness from the center. To attain the desired effect the curvature of the outer surface 50 of said lens member 40 is the same as that of said inner or convex surface 46. However, the outer surface is smooth and continuous throughout, preferably including said rim portions 42. Therefore, any light passing outwardly through said inner convex surfaces 46 is not distorted or otherwise changed.

At the closed end of said lens member is an approximately circular shaped lens portion 50 at its periphery having an inner convex surface 52 of the same curvature as said outer surface 50, thus presenting a continuous, curved outer surface from rim portion 42 throughout said lens member 40.

I show cut-outs 54 extending from the open end of said lens member 40 inwardly to permit the escape of heat.

I have shown said lens members 40 as duplicate halves, the two taking the approximate form of a circular globe. However, the lens members may take other forms, or a single member 40 may be used alone. The form and size depend partly upon the effect desired from the light passing through said lens portions 45, as well as the space available. A single lens member 40 forms a partial globe, as shown.

What I claim is:

1. A bow-shaped lens member having a continuous, smooth outer surface comprising an outer edge portion, a plurality of integral circumferential rows of double-convex lens portions at the inner surface of said lens member and adjoining each other some of which portions are completely bordered by four straight lines, an integral central portion at the apex of said bowl, and a circumferential row of said lens portions intermediate said outer edge and said apex each being completely bordered by five straight lines.

2. A bowl-shaped lens member as set forth in claim 1, said straight lines at opposite sides of each of said lens portions that are in adjoining relationship in a direction towards said central portion being in alinement whereby to define curved lines that extend unbrokenly from said outer edge portion to said central portion.

3. A bowl-shaped lens member as set forth in claim 1, each said five-line lens portion having two lines extending from opposite sides thereof and meeting at an intermediate lateral point between said latter two opposite sides, said latter two lines being nearer said outer edge portion than the three other of said five lines, thereby to define curved lines extending unbrokenly from said outer edge portion to said intermediate points of meeting.

4. A bowl-shaped lens member having a continuous, smooth outer surface comprising an outer edge, six integral circumferential rows of double-convex lens portions at the inner surface of said lens member each of said lens portions in five of which rows are completely bordered by four straight lines and each of said lens portions in one of which rows is completely bordered by five straight lines, an integral central lens portion at the apex of said bowl, there being one only row of said lens portions bordered by four straight lines between said row of five-line lens portions and said central portion.

References Cited by the Examiner

UNITED STATES PATENTS

| | | | |
|---|---|---|---|
| 578,620 | 3/1897 | Barker | 88—57 |
| 1,447,589 | 2/1923 | Leech et al. | 240—8.22 |
| 2,721,256 | 10/1955 | Duhon | 240—10.1 |
| 2,770,716 | 11/1956 | Kingery | 240—41.3 |
| 3,063,334 | 11/1962 | Smith | 88—24 |

FOREIGN PATENTS

| | | |
|---|---|---|
| 71,610 | 10/1893 | Germany. |
| 23,200 | 1895 | Great Britain. |
| 26,820 | 1912 | Great Britain. |

NORTON ANSHER, *Primary Examiner.*

J. F. PETERS, *Assistant Examiner.*